Jan. 28, 1930.  L. W. JONES  1,745,302
CHUCK
Filed July 22, 1926

Inventor
Louis W. Jones,

By John S. Barker
Attorney

Patented Jan. 28, 1930

1,745,302

UNITED STATES PATENT OFFICE

LOUIS W. JONES, OF NEW YORK, N. Y., ASSIGNOR, BY MESNE ASSIGNMENTS, TO JONES TOOL CO. INC., A CORPORATION OF NEW YORK

CHUCK

Application filed July 22, 1926. Serial No. 124,218.

This invention relates to chucks and has for one of its objects to provide a tool holding chuck which is susceptible to wide use although it is primarily intended for use in connection with the heads of joist boring machines of the type shown in my prior Patent #969,632, granted Sept. 6, 1910, and entitled, "Boring machines".

A further object of the invention is to provide a chuck of the class described which includes longitudinally movable fulcrumed jaws provided with means for producing such longitudinal movement and means for holding or locking the jaw actuating means against unintentional or undesired movements.

A further object of the invention is to provide a chuck embodying a one piece tubular sleeve which in the case of a boring machine of the type above mentioned, may have formed integral or rigid therewith, a driving means and which is provided with a plurality of recesses having inclined cam surfaces for cooperating with the movable jaws whereby the said jaws while being capable of relative longitudinal movement are held against rotary movement relative to the sleeve.

A still further object of the invention is to provide a chuck and boring head of the class described which will be simple in construction, comparatively inexpensive to manufacture and more efficient in use than those which have been heretofore proposed.

With the above and other objects in view which will appear as the description proceeds, the invention consists in the novel details of construction and combinations of parts more fully hereinafter described and particularly pointed out in the appended claim.

Referring to the accompanying drawings forming a part of this specification in which like reference characters designate like parts in all the views.

Figure 1:
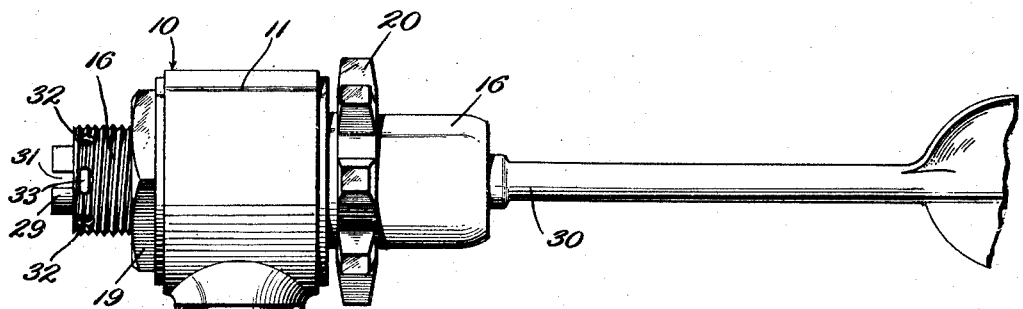
Figure 1, is a side elevational view of a boring head for a joist boring machine of the general type shown in my said prior Patent #969,632, which head embodies a chuck, constructed in accordance with the present invention.

Referring more particularly to the said drawing, the numeral 10 indicates generally the head of a boring machine of the type disclosed in my said prior patent which may comprise a hollow cylindrical yoke 11 to which is rigidly secured in any desired manner, a radially projecting tubular member 12 which latter is adapted to be connected to a supporting post or member 13 as will be readily understood. The interior of the cylindrical yoke 11 is provided with the bearing races 14 for receiving the anti-friction balls 15 as will be clear from Fig. 2.

Figure 2:
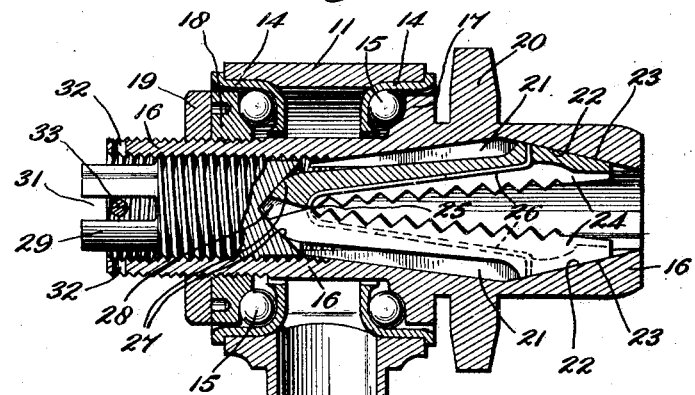
Fig. 2 is a central vertical sectional view of the boring head and chuck shown in Fig. 1; and, Fig. 3 is an end elevational view of the parts shown in Figs. 1 and 2, as viewed from the right of the said figures.
Figure 3:
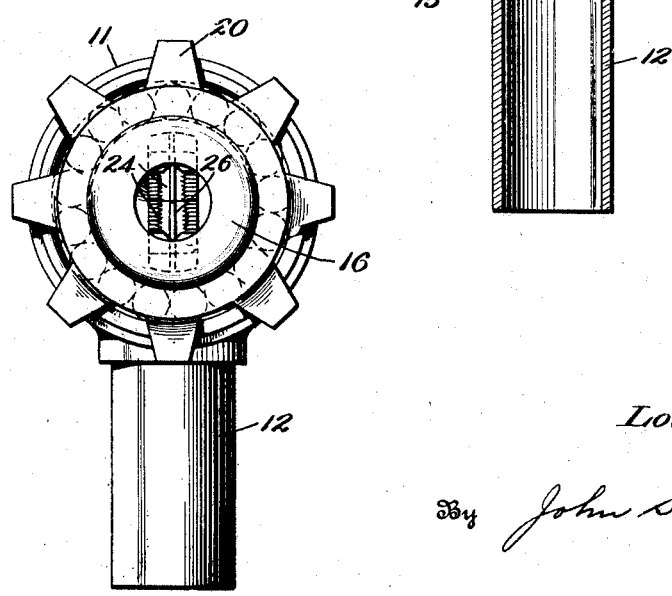

A hollow chuck sleeve 16 having a rigid ball race member 17 and a removable ball race member 18 engaging the balls 15 is mounted for rotation within the yoke 11, as will be readily understood from Fig. 2 and the said race member 18 may be locked in adjusted position by means of a lock nut 19 as shown.

The tubular chuck sleeve 16, in the case of boring machines of the type disclosed, is preferably provided with an integral sprocket 20 which is adapted to be engaged by a driving chain, not shown, but similar to that disclosed in my said prior patent. This said sleeve is also provided on its interior with diametrically opposed recesses or grooves 21 which have the inclined cam faces 22 which are adapted to coact with the companion cam faces 23 formed upon the pair of gripping jaws 24 which are slidably mounted in the said recesses 21 but which are held by the walls of the said recesses against rotary movement, relative to the sleeve 16. The said jaws are fulcrumed upon one another at a point 25 and are provided with a hairpin or other suitable spring 26 for normally urging them apart, as will be readily understood.

The rear ends of the jaws 24 are preferably rounded as indicated at 27 and are engaged by the walls of the cone shaped depression 28 formed in the inner end of an actuating plug 29 which is threaded as shown, into the interior of the rear end of the sleeve 16. It will be clear from Fig. 2 that rotation of the plug 29 in one direction will, through the threaded engagement with the sleeve 16, produce an axial movement of the said plug which will force the jaws 24 toward the right, as viewed in Fig. 2, and through the engagement of the inclined faces 22 and 23 will cause the said jaws to fulcrum about the point 25 and approach one another at their opposite ends to grip the shank of a boring tool 30 in the well known manner.

It has been found in actual practice that frequently, the frictional engagement of the threads of the plug member 29 and the sleeve 16 is insufficient to prevent reverse rotation of the plug with the result that the jaws 24 are permitted to recede within the sleeve 16 and thereby loosen their grip on the shank of the boring tool 30 to such an extent that said tool is unintentionally withdrawn from the chuck. In order to prevent such unintentional loosening of the parts, I provide the rear end of the plug 28 which is preferably reduced, as shown, with a slot or recess 31 and I provide the rear end of the sleeve 16 with a plurality of pairs of diametrically opposite holes 32 extending through the walls of the said sleeve. It is thus possible, after the plug 29 has been rotated sufficiently by means of a screw driver or other suitable tool inserted in said slot 31, to cause the jaws 24 to tightly grip the shank of the boring tool 30 to insert a cotter pin or other locking member 33 through a pair of the holes 32 and the slot or recess 31 and to thereby key or lock the plug 29 against unintentional reverse rotation. It thus results that after the parts have been once adjusted so that the jaws 24 tightly engage the shank of the boring tool 30 that any number of holes may be bored with the device without danger of the chuck jaws loosening their grip upon the said tool and the latter being unintentionally withdrawn therefrom.

While one form of the invention has been illustrated and described, it is obvious that those skilled in the art may vary the details of construction as well as the precise arrangements of parts without departing from the spirit of the invention and therefore, it is not wished to be limited to the above disclosure, except as may be required by the claim.

What is claimed is:

A chuck comprising a hollow sleeve having a plurality of circumferentially arranged apertures in its walls; jaws mounted in said sleeve for longitudinal movement relative thereto; a plug threaded in said sleeve for moving said jaws, said plug having a tool receiving aperture in its outer end adapted to align with the apertures in said sleeve; and a key member entering said aligned apertures for locking said plug and sleeve together.

LOUIS W. JONES.